(12) United States Patent
Won et al.

(10) Patent No.: US 10,135,508 B2
(45) Date of Patent: Nov. 20, 2018

(54) METHOD AND APPARATUS FOR GENERATING COMMON SIGNAL IN MULTIPLE INPUT MULTIPLE OUTPUT SYSTEM

(71) Applicant: Electronics and Telecommunications Research Institute, Daejeon (KR)

(72) Inventors: Seok Ho Won, Daejeon (KR); Suchang Chae, Daejeon (KR); Seyoung Cho, Daejeon (KR); Il Gyu Kim, Okcheon-gun Chungcheongbuk-do (KR); Seung Chan Bang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 120 days.

(21) Appl. No.: 14/881,782

(22) Filed: Oct. 13, 2015

(65) Prior Publication Data
US 2016/0105870 A1    Apr. 14, 2016

(30) Foreign Application Priority Data

Oct. 13, 2014  (KR) .................. 10-2014-0137773
Sep. 16, 2015  (KR) .................. 10-2015-0131173

(51) Int. Cl.
*H04B 7/06*    (2006.01)
*H04B 7/0413*    (2017.01)

(52) U.S. Cl.
CPC ......... *H04B 7/0617* (2013.01); *H04B 7/0413* (2013.01); *H04B 7/0689* (2013.01)

(58) Field of Classification Search
CPC ... H04B 7/0689; H04B 7/0617; H04B 7/0413
See application file for complete search history.

(56) References Cited

U.S. PATENT DOCUMENTS 9,252,908 B1 *   2/2016  Branlund ................ H04J 14/00
9,735,940 B1 *   8/2017  Bakr ..................... H04L 5/0053
(Continued)

FOREIGN PATENT DOCUMENTS

KR    1020140041765 A    4/2014

OTHER PUBLICATIONS

Xiang Gao et al., "Massive MIMO in real propagation environments", Mar. 13, 2014, pp. 1-10.
(Continued)

*Primary Examiner* — Ivan O Latorre
(74) *Attorney, Agent, or Firm* — William Park & Associates Ltd.

(57) ABSTRACT

Provided is a method for generating, by a base station, a common signal commonly required for surrounding terminals of the base station in a massive multiple input multiple output (MIMO) system. The base station generates data commonly required for the surrounding terminals. The base station generates a plurality of beamforming vectors using a time-domain constant amplitude (TCA)-frequency-domain constant amplitude (FCA) sequence having a constant size in a time domain and a frequency domain. Further, the base station generates a plurality of antenna streams corresponding to the common signal by multiplying the plurality of beamforming vectors by the data.

7 Claims, 16 Drawing Sheets

(56) References Cited

U.S. PATENT DOCUMENTS

| | | | |
|---|---|---|---|
| 2009/0238137 A1* | 9/2009 | Kishiyama | H04J 13/0062 370/330 |
| 2010/0135360 A1* | 6/2010 | Kwak | H04L 5/0016 375/135 |
| 2012/0320874 A1 | 12/2012 | Li et al. | |
| 2013/0258964 A1* | 10/2013 | Nam | H04W 72/046 370/329 |
| 2013/0308715 A1* | 11/2013 | Nam | H04B 7/0469 375/267 |
| 2013/0315168 A1* | 11/2013 | Frank | G01S 5/10 370/329 |
| 2014/0192768 A1 | 7/2014 | Etri | |
| 2014/0294107 A1 | 10/2014 | Etri | |
| 2014/0359355 A1* | 12/2014 | Nishikawa | H04L 1/1874 714/18 |
| 2015/0003325 A1* | 1/2015 | Sajadieh | H04B 7/0452 370/328 |
| 2015/0117561 A1* | 4/2015 | Benjebbour | H04W 76/36 375/267 |
| 2015/0146652 A1* | 5/2015 | Xu | H04B 7/0665 370/329 |
| 2015/0341097 A1* | 11/2015 | Yang | H04B 7/0617 370/329 |
| 2016/0156399 A1* | 6/2016 | Chen | H04B 7/0626 375/267 |
| 2016/0173180 A1* | 6/2016 | Cheng | H04B 7/0469 375/267 |
| 2016/0241323 A1* | 8/2016 | Ko | H04B 7/0691 |
| 2016/0254830 A1* | 9/2016 | Corbalis | H04B 1/123 455/307 |
| 2016/0359596 A1* | 12/2016 | Wild | H04B 7/0695 |
| 2017/0006638 A1* | 1/2017 | Sahlin | H04J 13/107 |
| 2017/0019159 A1* | 1/2017 | Vook | H04B 7/0478 |
| 2017/0033853 A1* | 2/2017 | Kim | H04B 7/0417 |
| 2017/0160381 A1* | 6/2017 | Cho | G01S 13/90 |
| 2017/0222702 A1* | 8/2017 | Tong | H04B 7/0617 |
| 2017/0244462 A1* | 8/2017 | Wei | H04B 7/0626 |
| 2018/0115912 A1* | 4/2018 | Gao | H04L 1/0668 |
| 2018/0152325 A1* | 5/2018 | Frank | H04L 25/0228 |

OTHER PUBLICATIONS

Seok Ho Won et al., "Backward Compatible MIMO Techniques in a Massive MIMO Test-bed for Long Term Evolution (LTE) Mobile Systems", ICACT2015, Jul. 1-3, 2015, pp. 688-692.

* cited by examiner

METHOD AND APPARATUS FOR GENERATING COMMON SIGNAL IN MULTIPLE INPUT MULTIPLE OUTPUT SYSTEM

CROSS-REFERENCE TO RELATED APPLICATION

This application claims priority to and the benefit of Korean Patent Application No. 10-2014-0137773 and 10-2015-0131173 filed in the Korean Intellectual Property Office on Oct. 13, 2014 and Sep. 16, 2015, the entire contents of which are incorporated herein by reference.

BACKGROUND OF THE INVENTION (a) Field of the Invention

The present invention relates to a method and an apparatus for generating a common signal which is a signal transmitted to omnidirection of the antennas; so commonly required for terminals in a multiple input multiple output (MIMO) system to transmit signal to the target terminal by making sharp radio beam.

(b) Description of the Related Art

Recently, a technology emerging as the strongest candidate technologies to satisfy requirements of a traffic increase in the fifth generation mobile communications may include multiple input multiple output (MIMO), that is, a massive MIMO technology which is an expansion of multiple antenna technology.

A system to which the massive MIMO is applied theoretically has several advantages in that fast fading is extinguished, throughput is increased, the number of service enabling terminals is increased regardless of a cell size, and the like. In addition, since the number of transmission RF paths and antennas is increased in the massive MIMO system, when total transmission power is constant, transmission power per antenna is reduced. As a result, the massive MIMO system is constructed as the specification for low power consuming and operating power amplifier (PA), etc., to reduce radio frequency (RF) component cost, such that it may economically be constructed. In particular, in the multiple antenna transmission system (massive MIMO system), a base station (for example, eNodeB) uses a signal of a user data to form a beam in a direction in which a terminal (for example, user equipment (UE)) is positioned, thereby increasing a transmission signal-to-noise ratio. For example, according to long term evolution (LTE) or LTE-advance (LTE-A) mobile communication standards which are being standardized in a third generation partnership project (3GPP), a signal of a physical downlink shared channel (PDSCH) which is each user data channel forms a beam at the place where a terminal is positioned for signal transmission. However, when a signal is a common channel signal which is a data signal commonly required for all terminals such as synchronous signal (SS), physical broadcast channel (PBCH) to inform system information to all terminals in the radio service area. In this case, the base station needs to omnidirectionally transmit the common channel signal rather than to transmit a common channel signal through beam formation based on the multiple antenna (MIMO antenna) so as to transmit the common channel signal to all terminals within a service area.

In this case, if the base station uses only some antennas without using all the antennas for omnidirectional transmission, the transmission power or outputs of RF stages and antenna parts need to be increased to cover the service area. In this case, expensive RF components such as a high output PA are required and the system needs to be designed to enable a high output.

Therefore, a method for transmitting the common channel signal using all the antennas or at least as many as antennas available in the multiple antenna system (MIMO system) is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for generating a common channel signal in a MIMO system (or, massive MIMO system, full dimensional (FD)-MIMO system) and transmitting the common channel signal using all available antennas.

Further, the present invention has been made in an effort to provide a method and an apparatus for constantly dividing power into all antennas and generating, by a summed signal of all the antennas, an omnidirectional beam, when a transmitter (for example, base station) transmits a common channel signal for all user terminals to receive in the whole radio service area of the base station (e.g., cell coverage area in the cellular system).

Further, the present invention has been made in an effort to provide a method and an apparatus for allowing each RF device of a transmitter not to require high power by making radiating power of all antenna elements or radiating elements constant when a transmitter (for example, base station) transmits a common channel signal.

An exemplary embodiment of the present invention provides a method for generating, by a base station, a common signal commonly required for surrounding terminals of the base station in a massive multiple input multiple output (MIMO) system. The method for generating a common signal includes: generating data commonly required for the surrounding terminals; generating a plurality of beamforming vectors using a time-domain constant amplitude (TCA)-frequency-domain constant amplitude (FCA) sequence having a constant size in a time domain and a frequency domain; and generating a plurality of antenna streams corresponding to the common signal by multiplying the plurality of beamforming vectors by the data.

The TCA-FCA sequence may be a constant amplitude zero auto-correlation (CAZAC) sequence.

The TCA-FCA sequence may be a Zadoff-chu sequence.

The generating of the plurality of beamforming vectors may include: generating the TCA-FCA sequence; performing fast Fourier transform (FFT) on the TCA-FCA sequence, and using the FFTed sequence as the plurality of beamforming vectors.

The generating of the plurality of beamforming vectors may include: generating a discrete Fourier transform (DFT) matrix; and generating the plurality of beamforming vectors by performing a scalar product of the TCA-FCA sequence by the DFT matrix.

Some of the vectors included in the DFT matrix may have a value of 0 or some of elements included in the TCA-FCA sequence may have a value of 0.

The generating of the plurality of beamforming vectors by performing the scalar product of the TCA-FCA sequence by the DFT matrix may include: prior to the scalar product, cyclically shifting at least one of a vector sequence including some or all of the vectors included in the DFT matrix and the TCA-FCA sequence.

The method may further include transmitting the common signal omnidirectionally through all the antennas.

The common signal may be one of a physical broadcasting channel (PBCH) signal, a physical downlink control channel (PDCCH) signal, a physical hybrid automatic repeat request indicator channel (PHICH) signal, a cell-specific reference signal, and a synchronization signal.

Another embodiment of the present invention provides a method for generating, by a base station, a common signal commonly required for surrounding terminals of the base station in a massive multiple input multiple output (MIMO) system. The method for generating a common signal includes: generating at least one of an elevation beamforming coefficient and an azimuth beamforming coefficient using a time-domain constant amplitude (TCA)-frequency-domain constant amplitude (FCA) sequence having a constant size in a time domain and a frequency domain; generating a beamforming array for a 2 dimensional (2D) antenna array by multiplying the elevation beamforming coefficient by the azimuth beamforming coefficient; and generating an antenna stream corresponding to the common signal by multiplying the beamforming array by the data commonly required for the surrounding terminals.

The generating of the at least one of the elevation beamforming coefficient and the azimuth beamforming coefficient may include: using the TCA-FCA sequence as at least one of the elevation beamforming coefficient and the azimuth beamforming coefficient.

The generating of the at least one of the elevation beamforming coefficient and the azimuth beamforming coefficient may include: performing fast Fourier transform (FFT) on the TCA-FCA sequence; and using the FFTed sequence as at least one of the elevation beamforming coefficient and the azimuth beamforming coefficient.

The generating of the at least one of the elevation beamforming coefficient and the azimuth beamforming coefficient may include: generating a discrete Fourier transform (DFT) matrix; and generating at least one of the elevation beamforming coefficient and the azimuth beamforming coefficient by performing a scalar product of the TCA-FCA sequence by the DFT matrix.

Yet another embodiment of the present invention provides a base station transmitting a common signal commonly required for surrounding terminals in a massive multiple input multiple output (MIMO) system. The base station includes: an omnidirectional beam pre-coder generating a plurality of beamforming vectors using a time-domain constant amplitude (TCA)-frequency-domain constant amplitude (FCA) sequence having a constant size in a time domain and a frequency domain, respectively, and multiplying the plurality of beamforming vectors by an input signal to generate a plurality of antenna streams corresponding to the common signal; and a processor controlling the omnidirectional beam pre-coder.

DETAILED DESCRIPTION OF THE EMBODIMENTS

Figure 1:
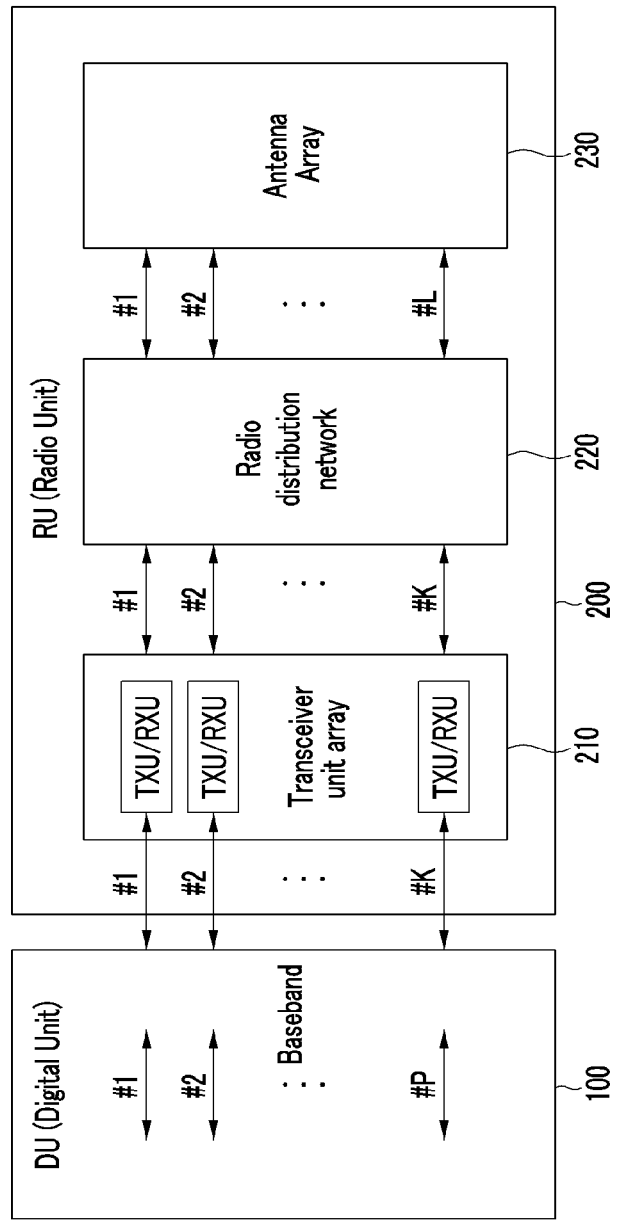
FIG. 1 is a diagram illustrating a digital unit (DU) and a radio unit (RU) configuring a massive MIMO system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a terminal may refer to a mobile terminal (MT), a mobile station (MS), an advanced mobile station (AMS), a high reliability mobile station (HR-MS), a subscriber station (SS), a portable subscriber station, an access terminal (AT), user equipment (UE), and the like and the terminal may also include all or some of the functions of the MT, the MS, the AMS, the HR-MS, the SS, the portable subscriber station, the AT, the UE, and the like.

Further, a base station (BS) may refer to an advanced base station (ABS), a high reliability base station (HR-BS), a nodeB, an evolved node B (eNodeB), an access point (AP), a radio access station (RAS), a base transceiver station (BTS), a mobile multihop relay (MMR)-BS, a relay station (RS) serving as a base station, a high reliability relay station (HR-RS) serving as a base station, a repeater, a macro base station, a small base station, and the like and the BS may also include functions of all or some of the ABS, the HR-BS, the nodeB, the eNodeB, the AP, the RAS, the BTS, the MMR-BS, the RS, the HR-RS, the repeater, the macro base station, the small base station, and the like.

Hereinafter, for better comprehension and ease of description, among orthogonal frequency division multiplexing (OFDM) transmission systems using an array antenna, an LTE-A system of 3GPP will be described as an example.

FIG. 1 is a diagram illustrating a digital unit (DU) 100 and a radio unit (RU) 200 configuring a multiple antenna transmission system (massive MIMO system) according to an exemplary embodiment of the present invention. In detail, the base station operating in the massive MIMO system may include the DU 100 and the RU 200.

The RU 200 includes a transceiver unit 210 (TXRU), a radio distribution network 220, and an antenna array 230. An operation of the RU 200 is already known, and therefore the detailed description thereof will be omitted.

Outputs of K RF transmission paths output from the DU 100 are connected to the RU 200. That is, P antenna ports of the DU 100 are mapped to K transmitter units (TXUs)/ receiver units (RXUx) of the RU 200. Each of the K RF paths is connected to L antennas through an analog RF circuit configured of the TXU and the RXU. In this case, K is generally equal to or smaller than L.

Figure 2:
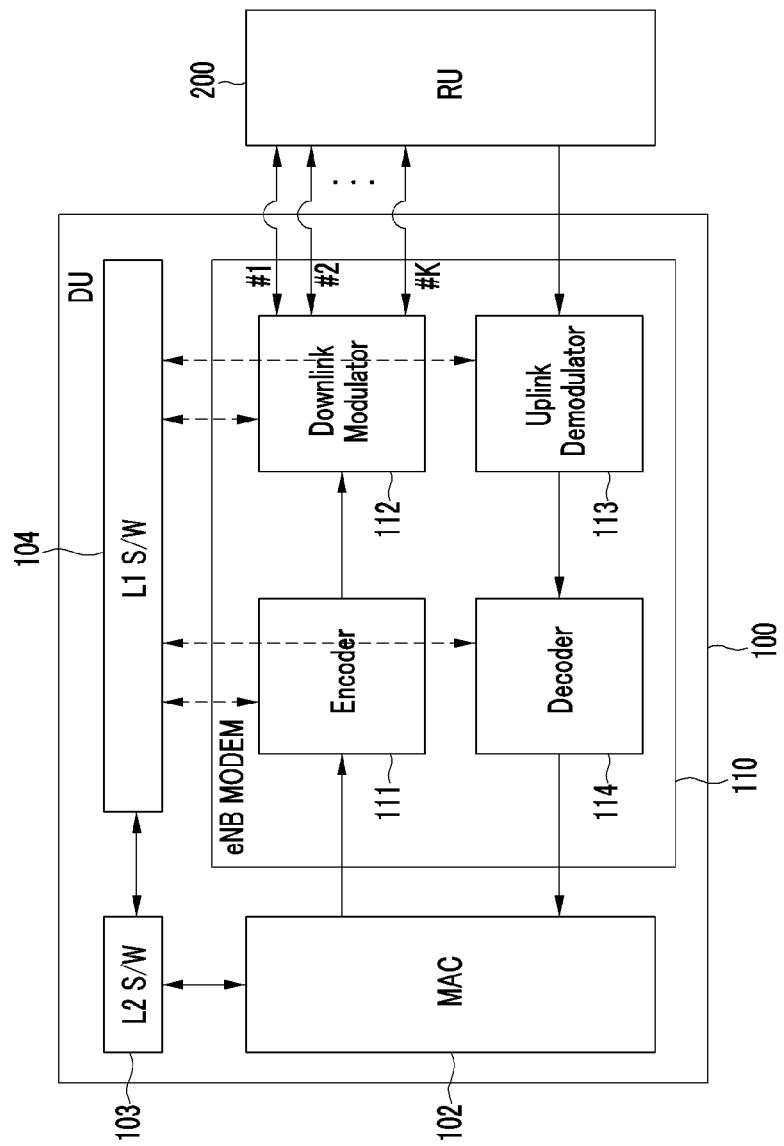
FIG. 2 is a diagram illustrating in detail a configuration of the DU illustrated in FIG. 1.

FIG. 2 is a diagram illustrating in detail a configuration of the DU 100 illustrated in FIG. 1.

The DU 100 includes a modem 110, a medium access control (MAC) 102, a layer 2 software (L2 S/W) 103, and a layer 1 software (L1 S/W) 104. The MAC 102, the L2 S/W 103 (or L2 controller) and the L1 S/W 104 are already known and therefore the detailed description thereof will be omitted.

The modem 110 includes an encoder 111, a downlink modulator 112, an uplink demodulator 113, and a decoder 114.

The encoder 111 and the downlink modulator 112 process a transmitted signal and the uplink demodulator 113 and the decoder 114 processes a received signal. Generally, a processing path for the received signal and a processing path for the transmitted signal are configured to be symmetrical to each other.

Figure 3:
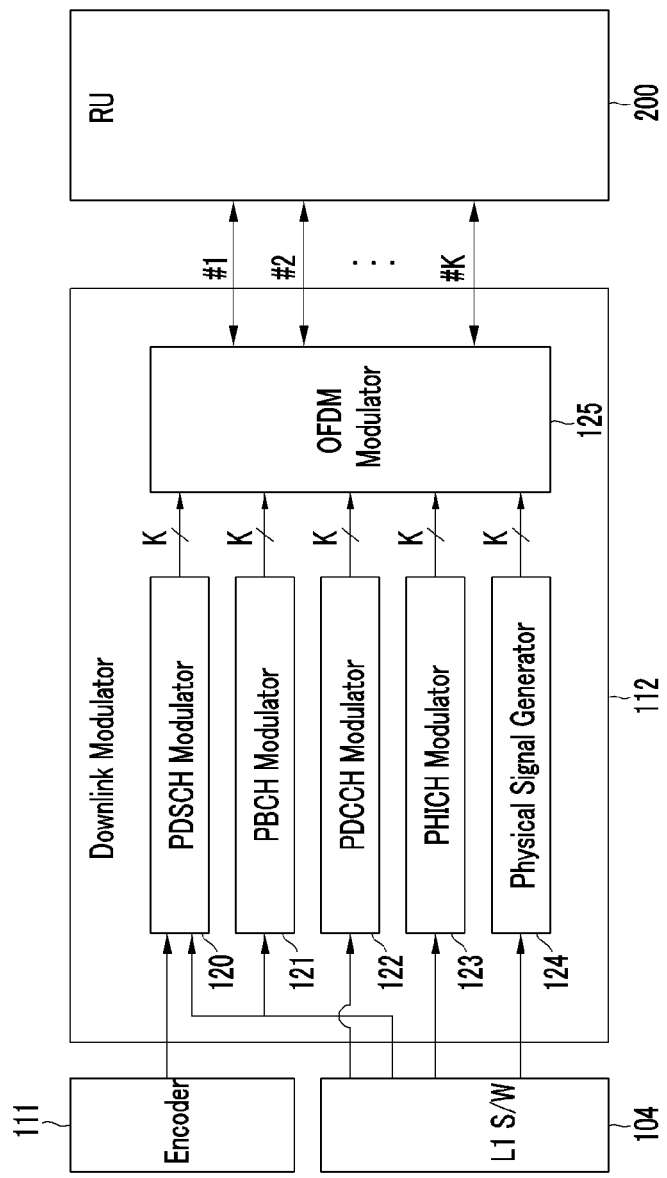
FIG. 3 is a diagram illustrating in detail a configuration of a downlink modulator illustrated in FIG. 2.

FIG. 3 is a diagram illustrating in detail a configuration of the downlink modulator 112 illustrated in FIG. 2. The encoder 111 may include an encoder for a PDSCH signal, an encoder for a PBCH signal, an encoder for a PDCCH signal and an encoder for a PHICH signal.

The downlink modulator 112 includes a physical downlink shared channel (PDSCH) modulator 120, a physical broadcasting channel (PBCH) modulator 121, a physical downlink control channel (PDCCH) modulator 122, a physical hybrid automatic repeat request indicator channel (PHICH) modulator 123, a physical signal generator 124, and an OFDM modulator 125.

The PDSCH modulator 120 is a modulator for a user data channel signal. The PBCH modulator 121 is a modulator for the PBCH signal, the PDCCH modulator 122 is a modulator for the PDCCH signal, and the PHICH modulator 123 is a modulator for the PHICH signal.

The physical signal generator 124 generates the physical signal. In detail, the physical signal generator 124 may generate a cell-specific reference signal (CS-RS) or a synchronization signal (for example, a primary synchronization signal (PSS) and a secondary synchronization signal (SSS)).

The OFDM modulator 125 performs OFDM modulation on signals output from each of the modulators 120 to 124. An operation of the OFDM modulator 125 is already known, and therefore the detailed description thereof will be omitted.

Meanwhile, a common channel signal which is a data signal commonly required for all terminals within a service area may correspond to the PBCH signal of the PBCH modulator 121, the PDCCH signal of the PDCCH modulator 122, the PHICH signal of the PHICH modulator 123, or the physical signal of the physical signal generator 124. Hereinafter, a method for transmitting the common signal, for example, the PBCH signal omnidirectionally will be described in detail.

A method for transmitting the common signal other than the PBCH signal may be identical/similar to the method for transmitting the PBCH signal.

Figure 4:
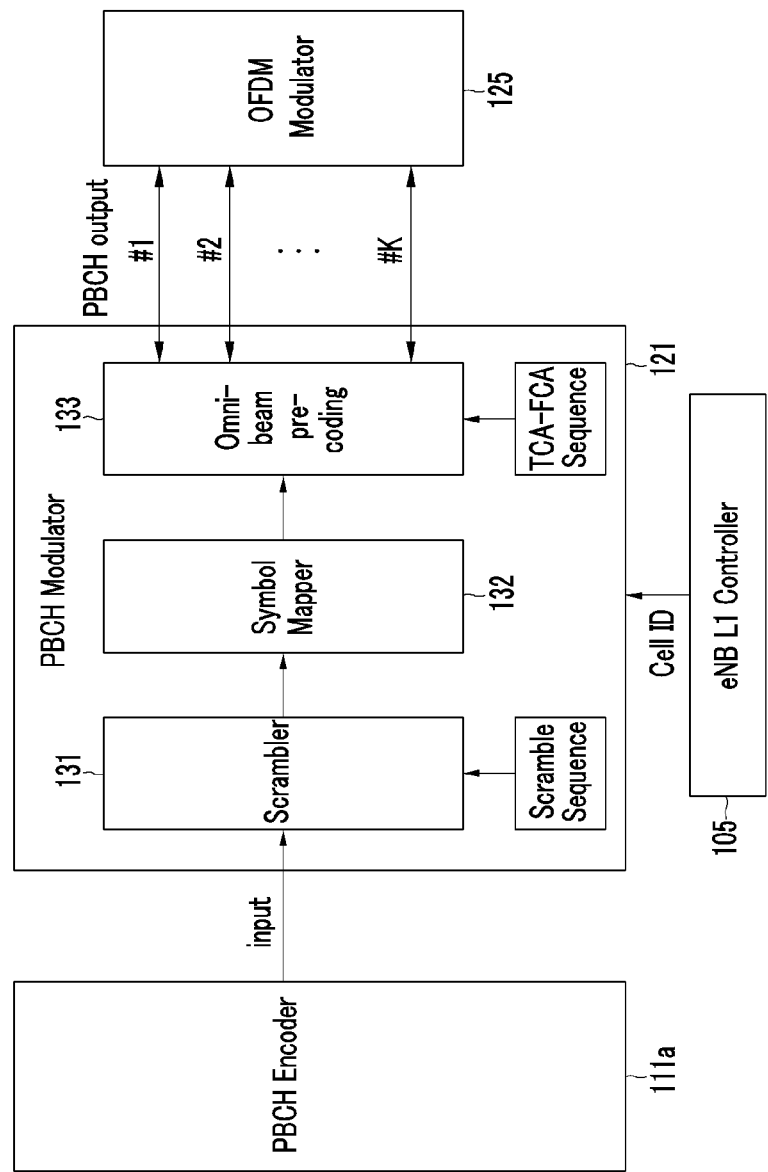
FIG. 4 is a diagram illustrating in detail a configuration of a PBCH modulator illustrated in FIG. 3.

FIG. 4 is a diagram illustrating in detail a configuration of the PBCH modulator 121 illustrated in FIG. 3.

The PBCH modulator 121 may use cell identification received from the L1 controller 105 upon PBCH signal modulation. The L1 controller 105 may be the L1 S/W 104, in which a configuration of the L1 controller 105 is already known and therefore the detailed description thereof will be omitted.

The PBCH modulator 121 includes a scrambler 131, a symbol mapper 132, and an omnidirectional beam pre-coder 133.

The scrambler 131 uses a scramble sequence to perform a scrambling operation on an input signal.

The symbol mapper 132 performs a symbol mapping operation on the input signal.

A data generated by a PBCH encoder 111a for the PBCH signal is converted into a complex signal by the scrambler 131 and the symbol mapper 132. Here, the PBCH encoder 111a may be included in the encoder 111 illustrated in FIG. 3.

The omnidirectional beam pre-coder 133 multiplies K beamforming vectors by the symbol mapped PBCH complex signal to generate K antenna streams. The K antenna streams are each connected (input) to the RU 200 via the OFDM modulator 125 corresponding to the antenna. Here, the omnidirectional beam pre-coder 133 uses a time-domain constant amplitude (TCA)-frequency-domain constant amplitude (FCA) sequence to generate K beamforming vectors.

Hereinafter, a TCA-FCA sequence generation and omnidirectional pre-coding method will be described.

First, for a 1 dimensional (1D) antenna array as an example, the TCA-FCA sequence generation and omnidirectional pre-coding method will be described.

The TCA-FCA sequence means a sequence that a complex sequence having a constant size in a time domain undergoes fast Fourier transform (FFT), etc., to be a complex sequence having a constant size even in a frequency domain. For example, the TCA-FCA sequence may be a constant amplitude zero auto-correlation (CAZAC) sequence series such as a Zadoff-chu sequence. Hereinafter, for convenience of explanation, the case in which the TCA-FCA sequence is the Zadoff-chu sequence will be described as an example.

A method (method M100) for using, by an omnidirectional beam pre-coder 133, a TCA-FCA sequence itself as the beamforming vector will be described. The omnidirectional beam pre-coder 133 generates the beamforming vector using the method M100 and generates the antenna stream corresponding to the common channel signal using the beamforming vector.

In the M100, the omnidirectional beam pre-coder 133 uses the TCA-FCA sequence (for example, Zadoff-chu sequence) having a constant size in the time domain and the frequency domain as the beamforming vector. For example, the Zadoff-chu sequence may be defined by the following Equation 1.

$$x_q(m) = e^{-j\frac{\pi q m(m+1)}{N_{ZC}}}, \quad \text{[Equation 1]}$$

$$0 \leq m \leq N_{SC} - 1 \text{ or } x_q(m) = e^{-j\frac{\pi q m^2}{N_{ZC}}}, 0 \leq m \leq N_{ZC} - 1$$

In the above Equation 1, $x_q(\ )$: the Zadoff-chu sequence of a q-th root, $N_{ZC}$: a length of the Zadoff-chu sequence.

The Zadoff-chu sequence defined by the above Equation 1 may also be represented by a pseudo code (for example, Matlab™ code) as follows.

```
K=16; %total number of txu/rxu chains
N=K;
m=0:N-1;
q=1;
seq=exp(-j*pi*q*m.* m+1/N); % CAZAC sequence
w = seq;
```

In the pseudo code, the case in which the number K of TXU/RXU chains is 16 and the $N_{ZC}$ is 16 is exemplified. In the pseudo code, the seq represents the TCA-FCA sequence and the w represents the omnidirectional pre-coding vector and corresponds to the beamforming vector.

Figure 5A:
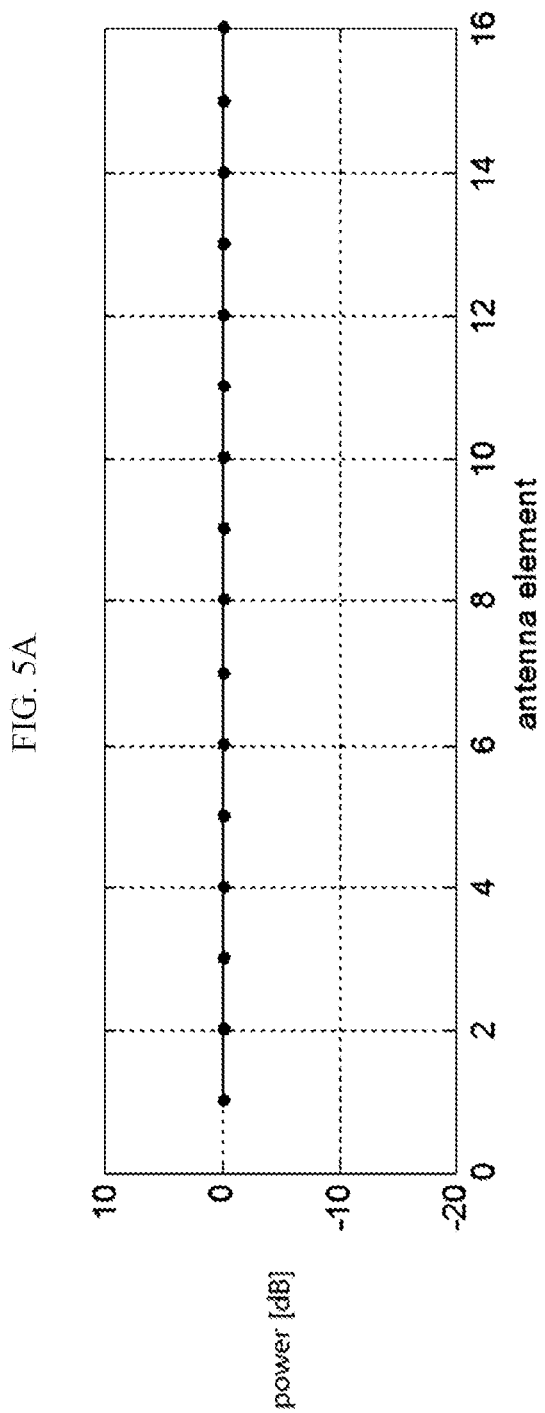
FIGS. 5A and 5B are diagrams illustrating a power distribution and a beam pattern of each antenna, when method M100 is used.
Figure 5B:
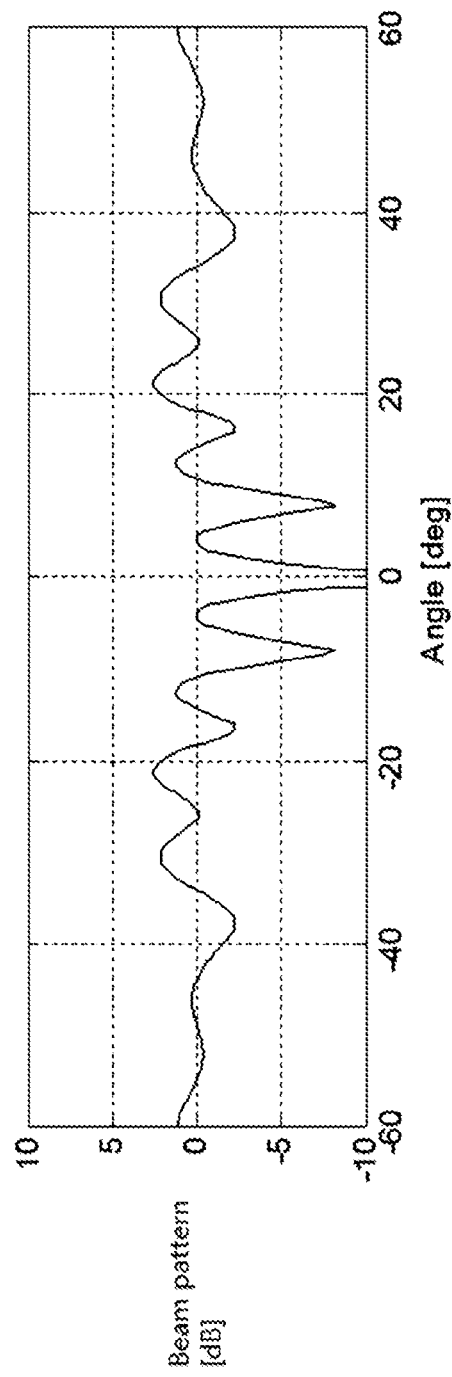

FIGS. 5A and 5B are diagrams illustrating a power distribution and a beam pattern of each antenna, when the method M100 is used. In detail, FIG. 5A illustrates a computer simulation result for each antenna power distribution when the PBCH omnidirectional pre-coding according to the method M100 is used. FIG. 5B illustrates a computer simulation result for a beam pattern when the PBCH omnidirectional pre-coding according to the method M100 is used. FIGS. 5A and 5B illustrate the case in which the number of antenna RF devices is 16.

As illustrated in FIGS. 5A and 5B, it may be appreciated that all of the 16 antenna RF devices have the same power distribution. On the other hand, it may be appreciated that a distribution of transmit power depending on a horizontal angle may not be greatly changed on the basis of 0 dB. Here, the transmit power is fluctuated by at most −6 dB at the remaining angle other than 0°, but the fluctuation may be flat by selecting another CAZAC sequence or adjusting a phase of the CAZAC sequence.

A method (method M200) for using by an omnidirectional beam pre-coder 133, a FFTed TCA-FCA sequence as a beamforming vector will be described. The omnidirectional beam pre-coder 133 generates the beamforming vector using the method M200 and generates the antenna stream corresponding to the common channel signal using the beamforming vector.

In the M200, the omnidirectional beam pre-coder 133 performs FFT on the TCA-FCA sequence (for example, Zadoff-chu sequence) having a constant size in the time domain and the frequency domain and uses the FFTed sequence as the beamforming vector. The method M200 may use the TCA-FCA sequence defined by the above Equation 1.

Meanwhile, the method M200 may be also represented by the following pseudo code (for example, Matlab™ code).

```
K=16; %total number of txu/rxu chains
N=K;
m=0:N-1;
q=1;
seq=exp(-j*pi*q*m.* m+1/N); % CAZAC seq.
f_seq = fft(seq); %%% Method M200. CAZAC -> FFT
w = f_seq;
```

In the pseudo code, the case in which the number K of TXU/RXU chains is 16 and the $N_{ZC}$ is 16 is exemplified. In the pseudo code, the seq represents the TCA-FCA sequence and the w represents the omnidirectional pre-coding vector and corresponds to the beamforming vector.

Figure 6A:
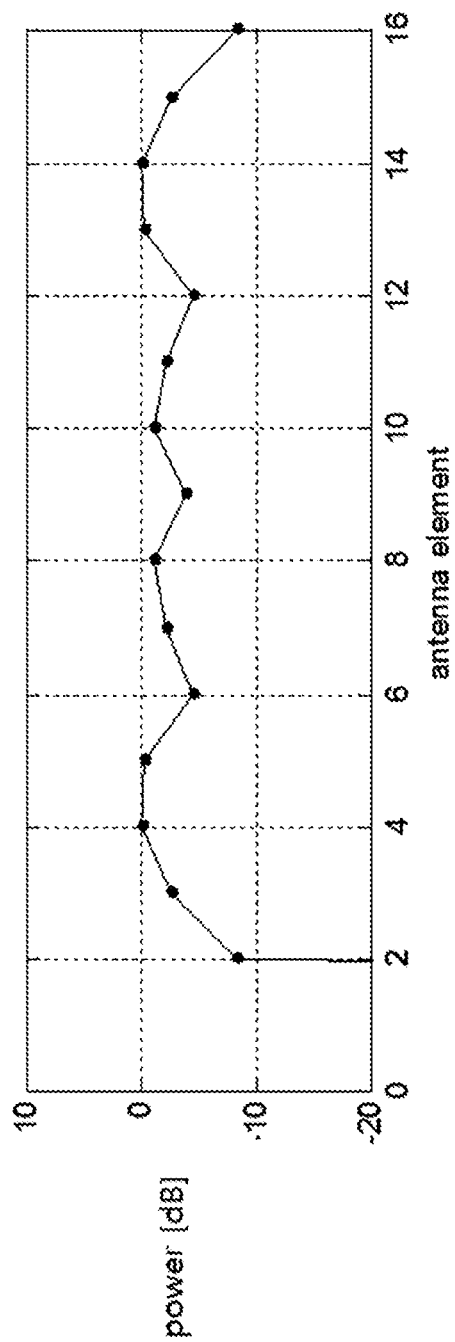
FIGS. 6A and 6B are diagrams illustrating a power distribution and a beam pattern of each antenna, when method M200 is used.
Figure 6B:
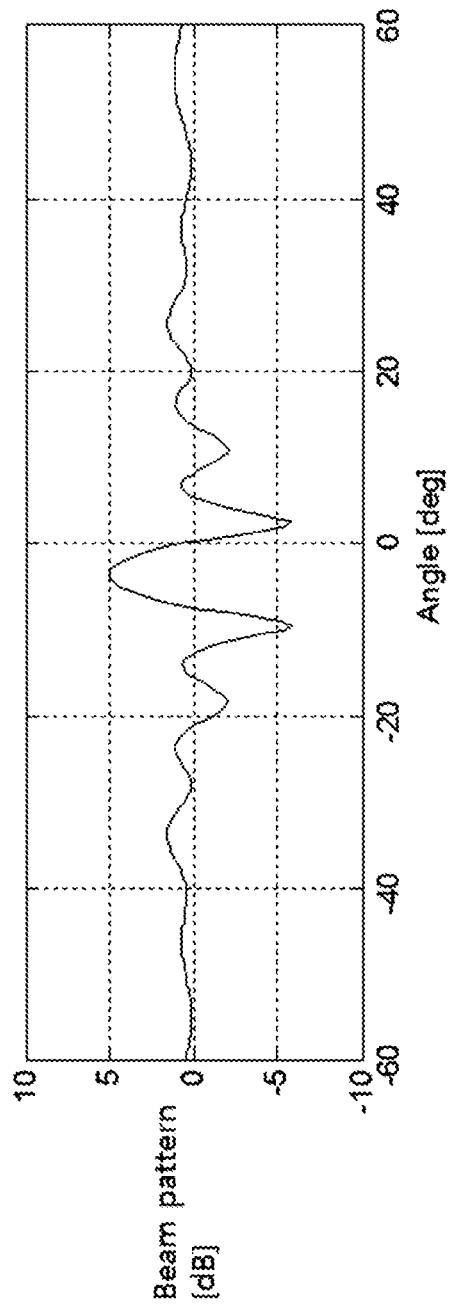

FIGS. 6A and 6B are diagrams illustrating a power distribution and a beam pattern of each antenna, when the method M200 is used. In detail, FIG. 6A illustrates a computer simulation result for each antenna power distribution when the PBCH omnidirectional pre-coding according to the method M200 is used. FIG. 6B illustrates a computer simulation result for a beam pattern when the PBCH omnidirectional pre-coding according to the method M200 is used. FIG. 6 illustrates the case in which the number of antenna RF devices is 16.

As illustrated in FIG. 6A, it may be appreciated that among antenna elements, power of No. 1 antenna element is little present and power of Nos. 2 and 16 antenna elements is very low.

As illustrated in FIGS. 6A and 6B, it may be appreciated that power is fluctuated by about −6 dB, but power of all the antenna elements is almost uniformly distributed.

The fluctuation of power is an error due to an FFT size and an FFT method and if the FFT size and the FFT method are accurately adjusted, the fluctuation of power may be removed and the power of the antenna element may be uniformly distributed as illustrated in FIGS. 5A and 5B.

A method (method M300) for performing, by the omnidirectional beam pre-coder 133, the scalar product of the TCA-FCA sequence by a given discrete Fourier transform (DFT) matrix or each pre-coding matrix to generate the beam forming vector will be described. The method M300 may use the TCA-FCA sequence defined by the above Equation 1. The omnidirectional beam pre-coder 133 generates the beamforming vector using the method M300 and generates the antenna stream corresponding to the common channel signal using the beamforming vector.

Figure 7:
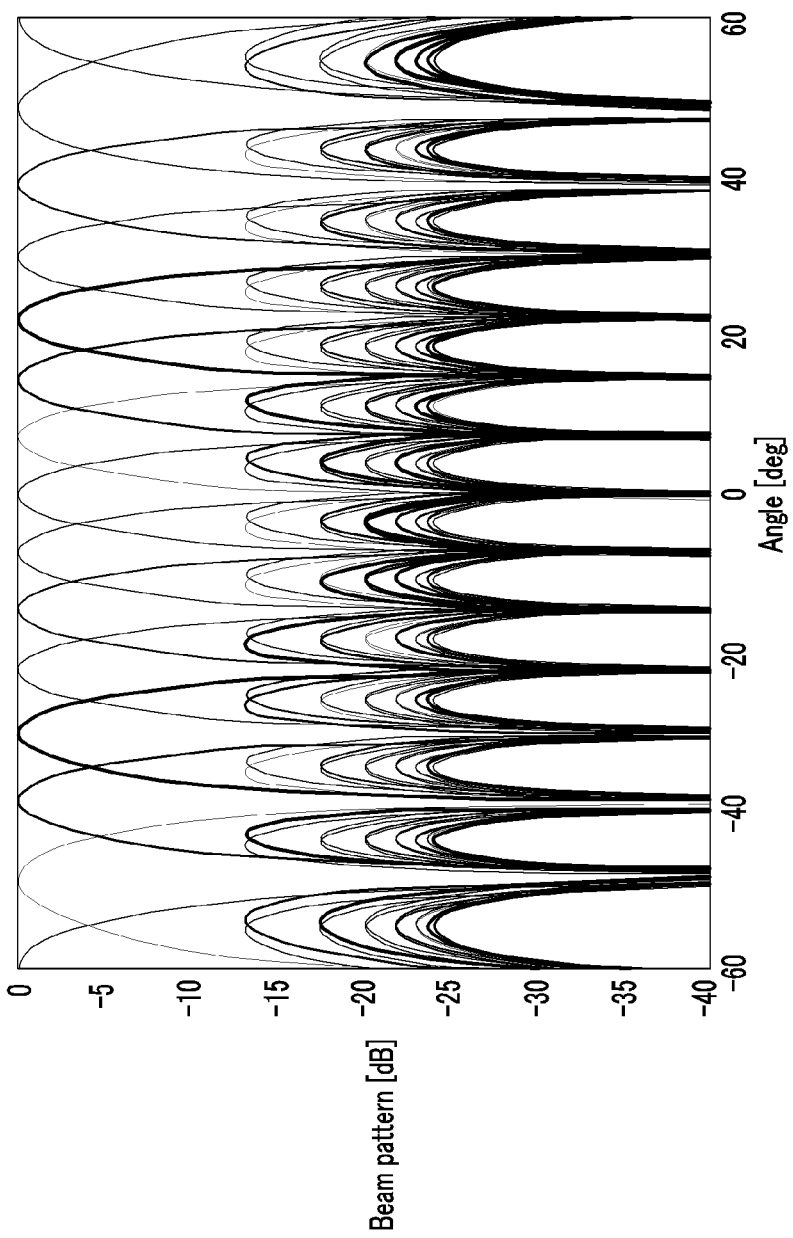
FIG. 7 is a diagram illustrating beam patterns according to a discrete Fourier transform (DFT) matrix generated by method M301.

Meanwhile, an element of a given DFT matrix may be considered as the beamforming vector which makes single beam and is widely known in the technical society as shown in FIG. 7. Further, instead of the DFT matrix, a matrix, etc., having other forms of beamforming vectors as a column vector element may also be used.

The given DFT matrix may be represented by the following Equation 2.

$$\text{DFT} \triangleq [v_1, v_2, \ldots, v_N] \quad \text{[Equation 2]}$$

If the beamforming vector generated by the method M300 is $\overline{w}$, a form of a scalar product of the TCA-FCA sequence by the DFT matrix of the Equation 2 may be represented by the following Equation 3.

$$\overline{w} = \alpha_1 v_1 + \alpha_2 v_2 + \ldots + \alpha_N v_N \quad \text{[Equation 3]}$$

In the above Equation 3, $\alpha_1, \alpha_2, \ldots, \alpha_N$ represent the element of the TCA-FCA sequence.

To intentionally make a shape of beam to be formed, in the above Equation 3, some upper elements, some intermediate elements, or some lower elements of the elements of the TCA-FCA sequence may have a value of 0. For example, lower coefficients $\alpha_1$, $\alpha_2$, and $\alpha_3$ and an upper coefficient $\alpha_N$ may have a value of 0. Further, a coefficient sequence (for example, $\alpha_1, \alpha_2, \ldots, \alpha_N$) may also be used while being cyclically shifted as much as a predetermined amount. For example, the omnidirectional beam pre-coder 133 may perform the scalar product of the cyclically shifted TCA-FCA sequence (for example, $\alpha_{N-1}, \alpha_N, \alpha_1, \alpha_2, \ldots, \alpha_{N-2}$, etc.) by the DFT matrix. Alternatively, to intentionally make the shape of beam to be formed, in the above Equation 3, some upper elements, some intermediate elements, or some lower elements included in the vector sequence configured of some or all of the vectors (for example, column vectors or row vectors) configuring the DFT matrix may also have a value of 0. For example, in the above Equation 3, the lower vectors $v_1$, $v_2$, and $v_3$ and the upper coefficient $v_N$ may have a value of 0. Further, the vector sequence (for example, $v_1$, $v_2, \ldots, v_N$) may also be used while being cyclically shifted as much as a predetermined amount. For example, the omnidirectional beam pre-coder 133 may perform the scalar product of the TCA-FCA sequence by the cyclically shifted vector sequence (for example, $v_{N-2}, v_{N-1}, v_N, v_1, v_2, \ldots, v_{N-3}$, etc.).

Meanwhile, the DFT matrix used in the method M300 may be generated by several methods. Among the methods, one method (method M301) may be represented by the following pseudo code (for example, Matlab™ code).

```
K=16; %total number of txu/rxu chains
Ne=K;
W_mat=zeros(Ne,Ne);
index=1;
for m=-Ne/2:Ne/2-1,
  n=(0:Ne-1)';
  W_mat(:,index)=exp (j*2*pi/Ne*m*n).*taper;
  index=index+1;
end
```

In the pseudo code, the case in which the number K of TXU/RXU chains is 16 is exemplified. In the pseudo code, the W_mat represents the DFT matrix. To convert the signal from the time domain into the frequency domain (or reversely), the signal is represented as linear coupling of each of the configuration frequency components (named as basis etc.). As illustrated in the pseudo code, continuous configuration frequency components, cyclically shifted configuration frequency components, discrete configuration frequency components, or the like may be used.

FIG. 7 is a diagram illustrating beam patterns depending on the DFT matrix generated by method M301. The beam pattern is formed while a magnitude in [dB] is changed depending on an angle. The desired pre-coding vector (newly generated target beamforming vector) may be obtained by performing the scalar product of the TCA-FCA sequence by the DFT matrix (matrix having the beamforming vectors as a row element) illustrated in FIG. 7.

A method for obtaining the desired omnidirectional pre-coding vector (beamforming vector) by performing the scalar product of the TCA-FCA sequence by the DFT matrix (beamforming vector) illustrated in FIG. 7 may be represented by the following pseudo code (for example, Matlab™ code).

```
K=16; %total number of txu/rxu chains
Ne=K;
for i=1:Ne,
  W_mat(:,i)=seq(i)*W_mat(:,i);
end
w = sum(W_mat (:,1 :Ne).');
w = w.';
```

In the pseudo code, the case in which the number K of TXU/RXU chains is 16 is exemplified. In the pseudo code, the seq represents the TCA-FCA sequence, the W_mat represents the foregoing DFT matrix, and the w represents the omnidirectional pre-coding vector and corresponds to the newly generated target beamforming vector.

Figure 8A:
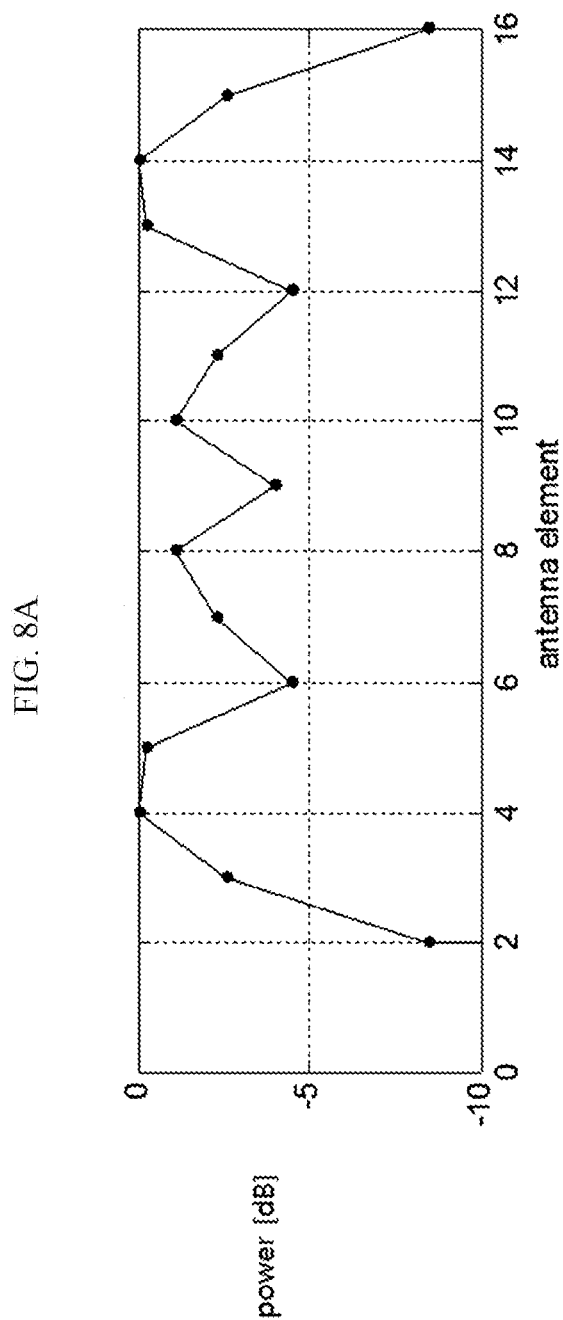
FIGS. 8A and 8B are diagrams illustrating a power distribution and a beam pattern of each antenna, when method M300 is used.
Figure 8B:
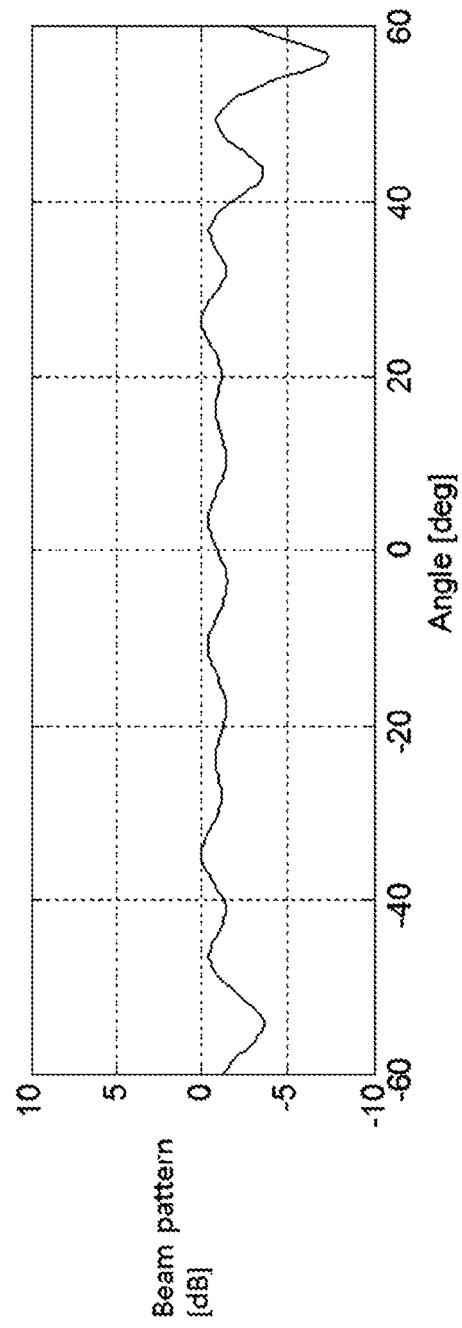

FIGS. 8A and 8B are diagrams illustrating a power distribution and a beam pattern of each antenna, when the method M300 is used. In detail, FIG. 8A illustrates a computer simulation result for each antenna power distribution when the PBCH omnidirectional pre-coding according to the method M300 is used. FIG. 8B illustrates a computer simulation result for a beam pattern when the PBCH omnidirectional pre-coding according to the method M300 is used. FIG. 8 illustrates the case in which the number of antenna RF devices is 16.

As illustrated in FIG. 8A, it may be appreciated that among antenna elements, power of No. 1 antenna element is little present and power of Nos. 2 and 16 antenna elements is very low.

As illustrated in FIGS. 8A and 8B, it may be appreciated that power is fluctuated by about −6 dB, but power of all the antenna elements is almost uniformly distributed. The fluctuation of power may be flat if the optimum sequence is used and a phase of the sequence is adjusted.

Figure 9:
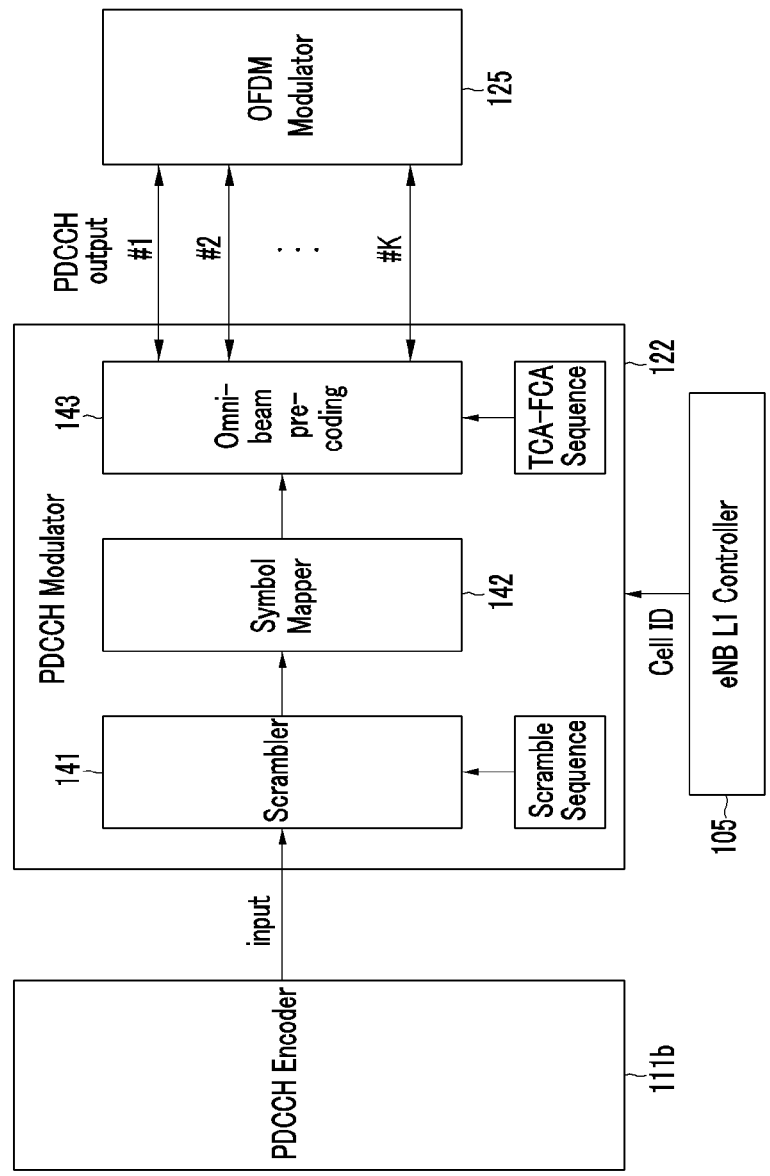
FIG. 9 is a diagram illustrating in detail a configuration of a PDCCH modulator illustrated in FIG. 3.

FIG. 9 is a diagram illustrating in detail a configuration of the PDCCH modulator 122 illustrated in FIG. 3.

The PDCCH modulator 122 may use cell identification received from the L1 controller 105 upon PDCCH signal modulation.

The PDCCH modulator 122 includes a scrambler 141, a symbol mapper 142, and an omnidirectional beam pre-coder 143.

The scrambler 141 uses a scramble sequence to perform a scrambling operation on the input signal and the symbol mapper 142 performs a symbol mapping operation on the input signal.

A data generated by a PDCCH encoder 111b for the PDCCH signal is converted into a complex signal by the scrambler 141 and the symbol mapper 142. Here, the PDCCH encoder 111b may be included in the encoder 111 illustrated in FIG. 3.

The omnidirectional beam pre-coder 143 may use at least one of the method M100, the method M200, and the method M300 as described above. A function and an operation of the omnidirectional beam pre-coder 143 are similar to those of the foregoing omnidirectional beam pre-coder 133.

Figure 10:
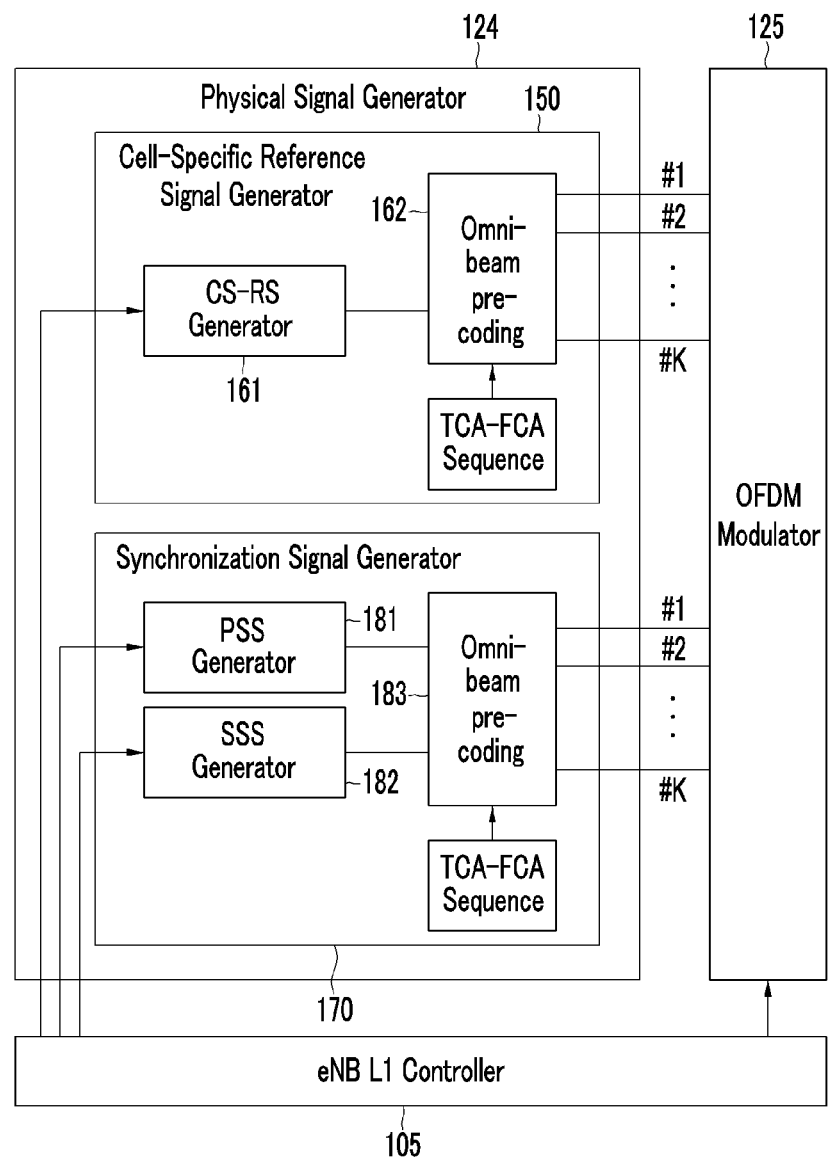
FIG. 10 is a diagram illustrating in detail a configuration of a physical signal generator illustrated in FIG. 3.

FIG. 10 is a diagram illustrating in detail a configuration of the physical signal generator 124 illustrated in FIG. 3.

The physical signal generator 124 includes a CS-RS generator 150 and a synchronization signal generator 170.

The CS-RS generator 150 includes a CS-RS generator 161 and an omnidirectional beam pre-coder 162.

The CS-RS generator 161 generates CS-RS. The CS-RS generator 161 may use the signal received from the L1 controller 105 at the time of generating the CS-RS.

The omnidirectional beam pre-coder 162 performs the pre-coding on the CS-RS of the CS-RS generator 161. In detail, the omnidirectional beam pre-coder 162 may use at least one of the method M100, the method M200, and the method M300 as described above at the time of performing the pre-coding on the CS-RS. A function and an operation of the omnidirectional beam pre-coder 162 are similar to those of the foregoing omnidirectional beam pre-coder 133.

The synchronization signal generator 170 includes a PSS generator 181, an SSS generator 182, and an omnidirectional beam pre-coder 183.

The PSS generator 181 generates PSS. The PSS generator 181 may use the signal received from the L1 controller 105 at the time of generating the PSS.

The SSS generator 182 generates SSS. The SSS generator 182 may use the signal received from the L1 controller 105 at the time of generating the SSS.

The omnidirectional beam pre-coder 183 performs the pre-coding on the PSS of the PSS generator 181 or the SSS of the SSS generator 182. In detail, the omnidirectional beam pre-coder 183 may use at least one of the method M100, the method M200, and the method M300 as described above at the time of performing the pre-coding on the PSS or the SSS. A function and an operation of the omnidirectional beam pre-coder 183 are similar to those of the foregoing omnidirectional beam pre-coder 133.

So far, the 1D antenna array is described as an example. Hereinafter, an exemplary embodiment of the present invention will be described, for example, a 2 dimensional (2D) antenna array which is an expansion of the 1D antenna array.

A beamforming array for the 2D antenna array is a product of an azimuth beamforming coefficient by an elevation beamforming coefficient, which may be represented by the following Equations 4, 5, and 6.

$$A_{BT} \triangleq \overline{w}_{el}\overline{w}_{az}^T = \begin{bmatrix} A_{00} & \cdots & A_{0(N-1)} \\ A_{10} & \cdots & A_{1(N-1)} \\ \vdots & \ddots & \vdots \\ A_{(M-1)0} & \cdots & A_{(M-1)(N-1)} \end{bmatrix} \quad \text{[Equation 4]}$$

$$A_{BT} \triangleq \quad \text{[Equation 5]}$$

$$\overline{w}_{el}\overline{w}_{az}^T = \begin{bmatrix} w_{el}(0)w_{az}(0) & \cdots & w_{el}(0)w_{az}(N-1) \\ w_{el}(1)w_{az}(0) & \cdots & w_{el}(1)w_{az}(N-1) \\ \vdots & \ddots & \vdots \\ w_{el}(M-1)w_{az}(0) & \cdots & w_{el}(M-1)w_{az}(N-1) \end{bmatrix}$$

$$A_{BT} \triangleq \overline{w}_{el}\overline{w}_{az}^T = \begin{bmatrix} w_{el}(0) \\ \vdots \\ w_{el}(M-1) \end{bmatrix} [w_{az}(0) \ldots w_{az}(N-1)] \quad \text{[Equation 6]}$$

In the above Equations 4 to 6, $A_{BT}$ represents a beamforming array (M×N) for the 2D antenna array, $W_{el}$ represents an elevation beamforming coefficient vector (M×1), $\overline{w}_{az}$ represents an azimuth beamforming coefficient vector (N×1), and $\overline{W}_{az}^T$ represents a transposed vector (1×N) of $\overline{w}_{az}$.

In Equations 5 and 6, $w_{el}(\ )$ represents the elevation beamforming coefficient, $w_{az}(\ )$ represents the azimuth beamforming coefficient, M represents the number of $w_{el}(\ )$, and N represents the number of $w_{az}(\ )$.

At least one of $\overline{w}_{el}$ and $\overline{w}_{az}$ of the above Equations 4 to 6 may be generated by the method M100, the method M200, or the method M300 as described above. In this case, the base station uses the method M100, the method M200, or the method M300 to generate at least one of $\overline{w}_{el}$ and $\overline{w}_{az}$, uses $\overline{w}_{el}$ and $\overline{w}_{az}$ to generate the beamforming array, and uses the beamforming array (for example, multiplying the beamforming array by data) to generate the antenna stream corresponding to the common channel signal.

In detail, when the method M100 is used, the base station may use the TCA-FCA sequence (for example, CAZAC sequence) having a constant size in the time domain and the frequency domain as a beamforming weight value ($\overline{w}_{el}$ or $\overline{w}_{az}$).

Alternatively, when the method M200 is used, the base station may use one obtained by performing the FFT on the TCA-FCA sequence (for example, CAZAC sequence) as the beamforming weight values ($\overline{w}_{el}$ or $\overline{w}_{az}$).

Alternatively, when the method M300 is used, the base station may perform the scalar product of the TCA-FCA sequence by the DFT matrix (or pre-coding matrix) to generate the beamforming weight values ($\overline{w}_{el}$ or $\overline{w}_{az}$).

For example, the $\overline{w}_{az}$ generated by the method M300 may be represented by the following Equation 7.

$$\text{DFT} \triangleq [v_1, v_2, \ldots, v_N]$$

$$\overline{w}_{az} = \Sigma_{i=2}^{N-3} \alpha_i v_i, \text{ where } \forall_i, |\alpha_i|=1 \quad \text{[Equation 7]}$$

In the above Equation 7, the DFT represents the DFT matrix and $\alpha_i$ represents the element of the TCA-FCA sequence.

Meanwhile, to intentionally make the shape of beam to be formed, some upper elements, some intermediate elements, or some lower elements of the elements of the TCA-FCA sequence may have a value of 0. For example, in the above Equation 7, the case in which the lower coefficient $\alpha_1$ and the upper coefficients $\alpha_{N-2}$, $\alpha_{N-1}$, and $\alpha_N$ have a value of 0 is exemplified. Further, the coefficient sequences ($\alpha_1$, $\alpha_2$, ..., $\alpha_N$) may also be used after being cyclically shifted as much as a predetermined amount. For example, the base station may perform the scalar product of the cyclically shifted TCA-FCA sequence (for example, $\alpha_{N-1}$, $\alpha_N$, $\alpha_1$, $\alpha_2$, ..., $\alpha_{N-2}$, etc.) by the DFT matrix. Alternatively, to intentionally make the shape of beam to be formed, some upper elements, some intermediate elements, or some lower elements included in the vector sequences (for example, $v_1$, $v_2$, ..., $v_N$) configured of some or all of the vectors (for example, column vectors or row vectors) configuring the DFT matrix may also have a value of 0. Further, the vector sequence (for example, $v_1$, $v_2$, ..., $v_N$) may also be used while being cyclically shifted as much as a predetermined amount. For example, the base station may also perform the scalar product of the TCA-FCA sequence by the cyclically shifted vector sequence (for example, $v_{N-2}$, $v_{N-1}$, $v_N$, $v_1$, $v_2$, ..., $v_{N-3}$, etc.).

Figure 11:
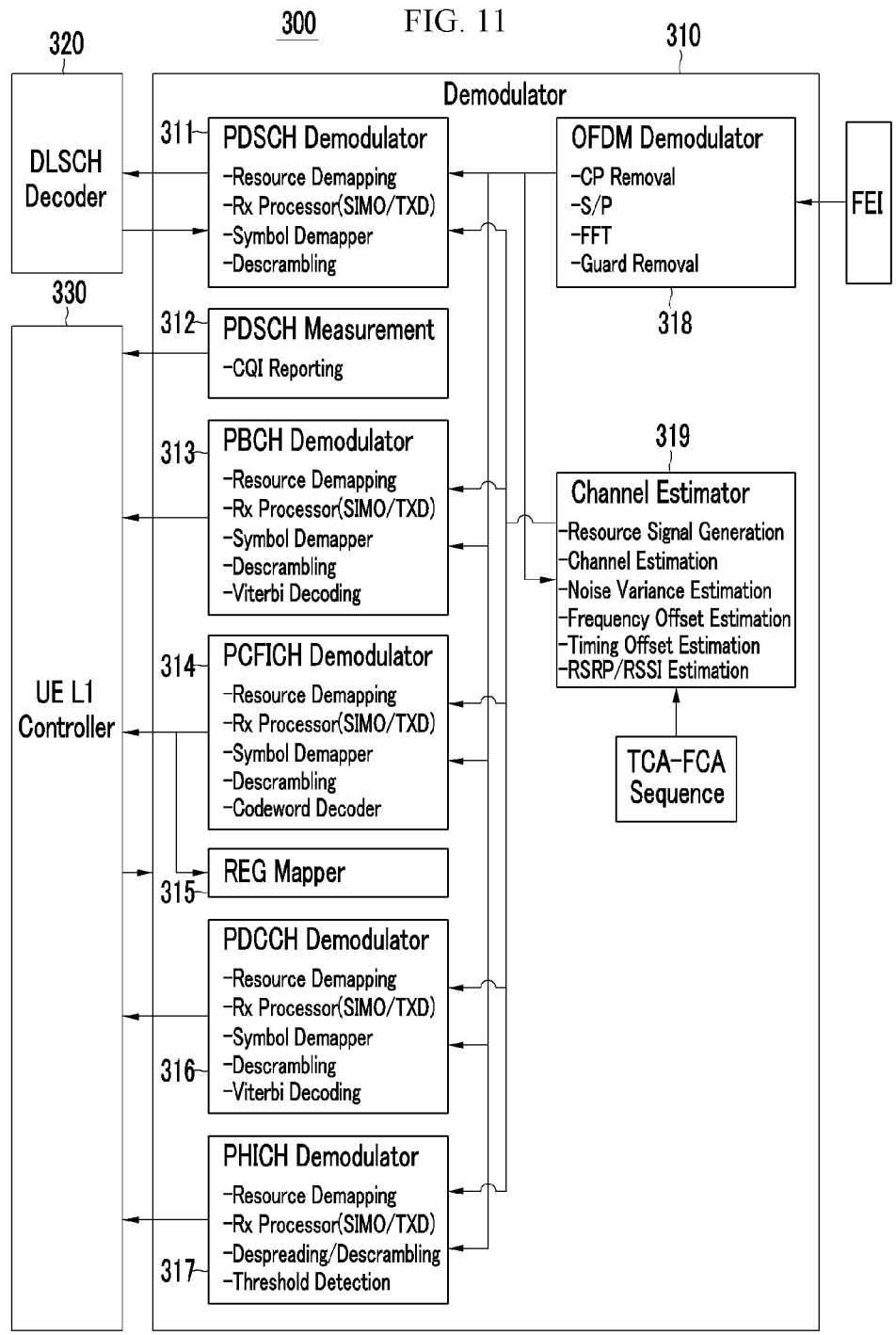
FIG. 11 is a diagram illustrating a terminal performing channel estimation using a TCA-FCA sequence, according to an exemplary embodiment of the present invention.

Meanwhile, if a demodulator of a receiver (for example, terminal) knows the TCA-FCA sequence, channel estimation may be more easily performed and one example of the demodulator is illustrated in FIG. 11. For example, the base station may inform the terminal, which is the receiver, of the TCA-FCA sequence through signaling (for example, in-band signaling or out-band signaling).

FIG. 11 is a diagram illustrating a terminal 300 performing channel estimation using a TCA-FCA sequence, according to an exemplary embodiment of the present invention.

The terminal 300 includes a demodulator 310, a downlink shared channel (DLSCH) decoder 320, and an L1 controller 330. The downlink shared channel (DLSCH) decoder 320 and the L1 controller 330 are already known, and therefore the detailed description thereof will be omitted.

The demodulator 310 includes a PDSCH demodulator 311, a PDSCH measurer 312, a PBCH demodulator 313, a PCFICH demodulator 314, an REG mapper 315, a PDCCH demodulator 316, a PHICH demodulator 317, an OFDM demodulator 318, and a channel estimator 319.

The OFDM demodulator 318 may use a frequency error indicator (FEI) upon OFDM demodulation. In detail, the OFDM demodulator 318 performs operations of cyclic prefix (CP) removal, serial-to-parallel processing, FFT, and guard removal, etc.

The channel estimator 319 uses the TCA-FCA sequence to perform the channel estimation. In detail, the channel estimator 319 performs operations of reference signal generation, channel estimation, noise variance estimation, frequency offset estimation, timing offset estimation, reference signal received power (RSRP)/received signal strength indicator (RSSI) estimation, and the like.

The PDSCH demodulator 311 performs operations of resource demapping, Rx processing (for example, single input multiple output (SIMO), transmit diversity (TXD)), symbol demapping, descrambling, and the like.

The PDSCH measurer 312 performs an operation of a channel quality indicator (CQI) report, etc.

The PBCH demodulator 313 performs operations of the resource demapping, the Rx processing (for example, single input multiple output (SIMO), transmit diversity (TXD)), the symbol demapping, the descrambling, viterbi decoding, and the like.

The physical control format indicator channel (PCFICH) demodulator 314 performs operations of the resource demapping, the Rx processing (for example, single input multiple output (SIMO), transmit diversity (TXD)), the symbol demapping, the descrambling, codeword decoding, and the like.

A resource element group (REG) mapper 315 performs an REG mapping operation.

The PDCCH demodulator 316 performs operations of the resource demapping, the Rx processing (for example, single input multiple output (SIMO), transmit diversity (TXD)), the symbol demapping, the descrambling, viterbi decoding, and the like.

The PHICH demodulator 317 performs operations of the resource demapping, the Rx processing (for example, single input multiple output (SIMO), transmit diversity (TXD)), dispreading/descrambling, a threshold detection, and the like.

Figure 12:
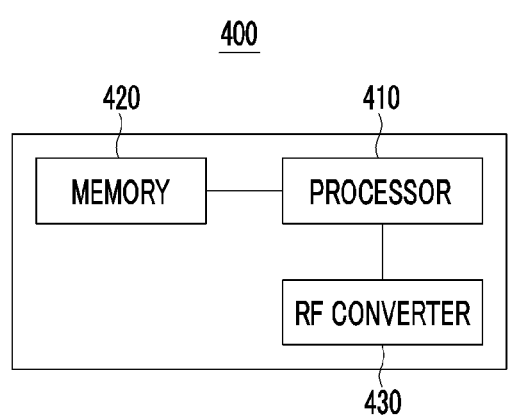
FIG. 12 is a diagram illustrating a configuration of a transmitter according to an exemplary embodiment of the present invention.

FIG. 12 is a diagram illustrating a configuration of a transmitter 400 according to an exemplary embodiment of the present invention.

The transmitter 400 further includes a processor 410, a memory 420 and an RF converter 430 as well as the foregoing components of the transmitter (for example, base station).

The processor 410 may be configured to implement functions, procedures, and methods associated with the common channel signal transmission as described above. Further, the processor 410 may control each component of the transmitter 400.

The memory 420 is connected to the processor 410 and stores various types of information associated with the operation of the processor 410.

The RF converter 430 is connected to the processor 410 to transmit and receive a radio signal. The transmitter 400 may be the base station.

Figure 13:
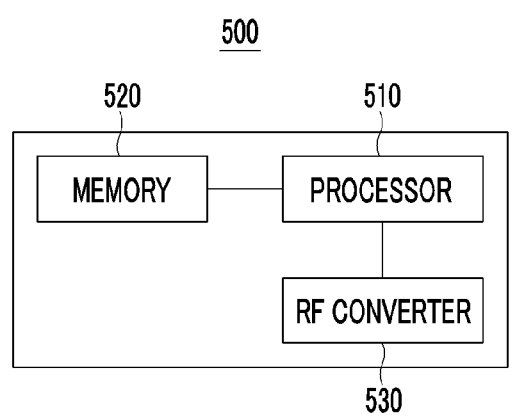
FIG. 13 is a diagram illustrating a configuration of a receiver according to an exemplary embodiment of the present invention.

FIG. 13 is a diagram illustrating a configuration of a receiver 500 according to an exemplary embodiment of the present invention.

The receiver 500 further includes a processor 510, a memory 520 and an RF converter 530 as well as the foregoing components of the receiver (for example, terminal 300).

The processor 510 may be configured to implement functions, procedures, and methods associated with the common channel signal reception as described above. Further, the processor 510 may control each component of the receiver 500.

The memory 520 is connected to the processor 510 and stores various types of information associated with the operation of the processor 510.

The RF converter 530 is connected to the processor 510 to transmit and receive a radio signal. The receiver 500 may be the terminal.

Meanwhile, the exemplary embodiment of the present invention describes, for example, the massive MIMO system, which is only an example. The exemplary embodiment of the present invention may also be applied to a system using a multiple antenna such as the MIMO system and a FD-MIMO system.

So far, the exemplary embodiment of the present invention is described, for example, the case in which the transmitter is the base station and the receiver is the terminal, which is only an example. The exemplary embodiment of the present invention may also be applied to the transmitter other than the base station and the receiver other than the terminal.

According to an exemplary embodiment of the present invention, it is possible to transmit the common channel signal at high efficiency and in omnidirection, in the MIMO system (or massive MIMO system, FD-MIMO system).

Further, according to the exemplary embodiments of the present invention, it is possible to constantly divide power into all the antennas and allow the summed signal of all the antennas to generate the omnidirectional beam, when the transmitter (for example, base station) transmits the common channel signal. By this, the radiating power of all the antenna elements (or radiating elements) is constant, such that each RF device of the transmitter may not require the high power. By this, the RF design of the RF chain (for example, transmitter unit (TXU)) may be simplified and the component (for example, PA, etc.) cost may be reduced, thereby lowering the price (cost) as a whole.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting a common signal, by a base station, in a massive multiple input multiple output (MIMO) system, the method comprising:
   generating, by the base station, a discrete Fourier transform (DFT) matrix;
   generating, by the base station, an elevation beamforming coefficient vector and an azimuth beamforming coefficient vector using a scalar product of the DFT matrix and a time-domain constant amplitude (TCA)-frequency-domain constant amplitude (FCA) sequence having a constant size in a time domain and a frequency domain;
   generating, by the base station, a beamforming array matrix for a 2 dimensional (2D) antenna array based on the elevation beamforming coefficient vector and the azimuth beamforming coefficient vector;
   generating, by the base station, an antenna stream corresponding to the common signal based on the beamforming array matrix and data commonly required for terminals; and
   transmitting, by the base station, omnidirectionally, the antenna stream to the terminals through the 2D antenna array.

2. The method of claim 1, wherein:
   the TCA-FCA sequence is a constant amplitude zero auto-correlation (CAZAC) sequence.

3. The method of claim 1, wherein:
the generating the elevation beamforming coefficient vector and the azimuth beamforming coefficient vector includes:
generating, by the base station, the elevation beamforming coefficient vector and the azimuth beamforming coefficient vector, using the TCA-FCA sequence as the elevation beamforming coefficient vector and the azimuth beamforming coefficient vector.

4. The method of claim 1, wherein:
the generating the elevation beamforming coefficient vector and the azimuth beamforming coefficient vector includes:
performing, by the base station, fast Fourier transform (FFT) on the TCA-FCA sequence; and
generating, by the base station, the elevation beamforming coefficient vector and the azimuth beamforming coefficient vector, using the FFTed sequence as the elevation beamforming coefficient vector and the azimuth beamforming coefficient vector.

5. The method of claim 2, wherein:
the CAZAC sequence is a Zadoff-chu sequence.

6. The method of claim 1, wherein: some upper elements or some lower elements of elements included in the TCA-FCA sequence have a value of 0.

7. The method of claim 1, wherein:
the generating, by the base station, of the beamforming array matrix includes:
generating, by the base station, the beamforming array matrix using the following Equation 1

$$A_{BF} = \begin{bmatrix} w_{el}(0) \\ \vdots \\ w_{el}(M-1) \end{bmatrix} [w_{az}(0) \ \ldots \ w_{az}(N-1)] \quad \text{[Equation 1]}$$

(ABF: the beamforming array matrix, wel( ): the elevation beamforming coefficient vector, waz( ): the azimuth beamforming coefficient vector, M: the number of elevation beamforming coefficient vectors, N: the number of azimuth beamforming coefficient vectors).

* * * * *